United States Patent
Sang et al.

(10) Patent No.: US 12,412,048 B2
(45) Date of Patent: Sep. 9, 2025

(54) AUTOMATICALLY INTEGRATING USER TRANSLATION FEEDBACK

(71) Applicant: INTERNATIONAL BUSINESS MACHINES CORPORATION, Armonk, NY (US)

(72) Inventors: Yi Shan Sang, Xian (CN); Jing Yang, Xian (CN); Chong Liu, Xian (CN); Jin Xu, Xian (CN); Chao Li, Xian (CN); Xu Lu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 17/557,737

(22) Filed: Dec. 21, 2021

(65) Prior Publication Data
US 2023/0196034 A1    Jun. 22, 2023

(51) Int. Cl.
*G06F 40/51*   (2020.01)
*G06F 8/658*   (2018.01)
*G06F 40/242*  (2020.01)

(52) U.S. Cl.
CPC .............. *G06F 40/51* (2020.01); *G06F 8/658* (2018.02); *G06F 40/242* (2020.01)

(58) Field of Classification Search
CPC ........ G06F 40/51; G06F 8/658; G06F 40/242; G06F 40/47; G06F 9/454
See application file for complete search history.

(56) References Cited

U.S. PATENT DOCUMENTS

| | | | |
|---|---|---|---|
| 6,401,091 B1 * | 6/2002 | Butler | G06F 16/907 707/999.005 |
| 6,937,974 B1 * | 8/2005 | d'Agostini | G06F 40/44 704/277 |
| 9,342,499 B2 | 5/2016 | Madnani et al. | |
| 9,552,354 B1 * | 1/2017 | Seligman | G06F 40/51 |
| 10,346,543 B2 | 7/2019 | Leydon et al. | |
| 10,650,086 B1 * | 5/2020 | Knudson | G06F 40/134 |

(Continued)

FOREIGN PATENT DOCUMENTS

CN    108563643    9/2018

OTHER PUBLICATIONS

Disclosed Anonymously, "A method of self-improvement translation with machine translation and social translation", IP. com, IPCOM000244449D, Dec. 13, 2015, 6 pages.

(Continued)

*Primary Examiner* — Bhavesh M Mehta
*Assistant Examiner* — Philip H Lam
(74) *Attorney, Agent, or Firm* — Kristofer Haggerty; Andrew D. Wright; Calderon Safran & Wright P.C.

(57) ABSTRACT

A method includes: receiving, by a computing device, user input indicating an incorrect translation of a word appearing in an interface of an application; identifying, by the computing device, other instances of the word in other interfaces of the application, wherein the identifying is performed using a glossary relationship set that is based on association analysis, wherein the other instances of the word constitute less than all instances of the word appearing in all interfaces of the application; and generating, by the computing device, a new version of the application having a revised translation of the word in the interface and the other instances of the word in the other interfaces.

20 Claims, 9 Drawing Sheets

(56) References Cited

U.S. PATENT DOCUMENTS

| | | | | |
|---|---|---|---|---|
| 11,003,426 | B1* | 5/2021 | Wilson | G06F 9/45508 |
| 2002/0169803 | A1* | 11/2002 | Sampath | G06F 40/106 |
| | | | | 715/234 |
| 2003/0101044 | A1* | 5/2003 | Krasnov | G06F 40/55 |
| | | | | 704/4 |
| 2003/0189603 | A1* | 10/2003 | Goyal | G10L 15/22 |
| | | | | 704/E15.04 |
| 2005/0075858 | A1* | 4/2005 | Pournasseh | G06F 40/58 |
| | | | | 704/2 |
| 2006/0047689 | A1* | 3/2006 | Gabbert | G06Q 10/10 |
| | | | | 707/999.102 |
| 2008/0195377 | A1* | 8/2008 | Kato | G06F 40/47 |
| | | | | 704/8 |
| 2009/0299732 | A1* | 12/2009 | Hao | G06F 40/289 |
| | | | | 704/10 |
| 2011/0202330 | A1* | 8/2011 | Dai | G06F 40/268 |
| | | | | 704/9 |
| 2012/0166984 | A1* | 6/2012 | Brunswig | G06F 3/04847 |
| | | | | 715/765 |
| 2012/0323557 | A1* | 12/2012 | Koll | G10L 15/183 |
| | | | | 704/8 |
| 2013/0035927 | A1* | 2/2013 | Cha | G06F 40/58 |
| | | | | 704/3 |
| 2013/0124987 | A1* | 5/2013 | Lakritz | H04L 63/0281 |
| | | | | 715/264 |
| 2013/0300636 | A1* | 11/2013 | Cunningham | G06F 3/013 |
| | | | | 345/8 |
| 2014/0081620 | A1* | 3/2014 | Solntseva | G06F 3/04883 |
| | | | | 704/3 |
| 2015/0032712 | A1* | 1/2015 | Green | G06F 16/285 |
| | | | | 707/706 |
| 2015/0120273 | A1* | 4/2015 | Gusakov | G06F 40/58 |
| | | | | 704/2 |
| 2015/0363394 | A1 | 12/2015 | Marciano et al. | |
| 2016/0224654 | A1* | 8/2016 | Tsuchida | G06N 20/00 |
| 2016/0232156 | A1 | 8/2016 | Orsini et al. | |
| 2017/0235722 | A1* | 8/2017 | Leydon | G06F 40/51 |
| | | | | 704/2 |
| 2018/0123814 | A1* | 5/2018 | Sexauer | H04L 51/04 |
| 2018/0129634 | A1* | 5/2018 | Sivaji | G06F 40/106 |
| 2018/0225278 | A1* | 8/2018 | Alba | G06F 40/30 |
| 2019/0171792 | A1* | 6/2019 | Manica | G06F 40/284 |
| 2020/0012717 | A1* | 1/2020 | Brown | G06F 40/205 |
| 2020/0160458 | A1* | 5/2020 | Bodin | H04L 67/53 |
| 2021/0019373 | A1* | 1/2021 | Freitag | G06F 40/58 |
| 2021/0216727 | A1* | 7/2021 | Liu | G06F 40/47 |
| 2021/0264804 | A1* | 8/2021 | Venkatasubramanyam | |
| | | | | G06N 5/04 |
| 2022/0294748 | A1* | 9/2022 | Crowley | G06F 40/35 |

OTHER PUBLICATIONS

Rozovskaya et al., "Grammatical Error Correction: Machine Translation and Classifiers", https://www.researchgate.net/publication/306093686, Proceedings of the 54th Annual Meeting of the Association for Computational Linguistic, Aug. 12, 2016, 12 pages.

* cited by examiner

AUTOMATICALLY INTEGRATING USER TRANSLATION FEEDBACK

BACKGROUND

Aspects of the present invention relate generally to translation systems and, more particularly, to adjusting translations in software applications based on user feedback.

Software applications that generate user interfaces, including dialog boxes, are sometimes translated from a first language to a second language. The applications sometimes include polysemous words in the user interfaces.

SUMMARY

In a first aspect of the invention, there is a computer-implemented method including: receiving, by a computing device, user input indicating an incorrect translation of a word appearing in an interface of an application; identifying, by the computing device, other instances of the word in other interfaces of the application, wherein the identifying is performed using a glossary relationship set that is based on association analysis, wherein the other instances of the word constitute less than all instances of the word appearing in all interfaces of the application; and generating, by the computing device, a new version of the application having a revised translation of the word in the interface and the other instances of the word in the other interfaces.

In another aspect of the invention, there is a computer program product including one or more computer readable storage media having program instructions collectively stored on the one or more computer readable storage media. The program instructions are executable to: receive user input indicating an incorrect translation of a word appearing in an interface of an application; identify other instances of the word in other interfaces of the application, wherein the identifying is performed using a glossary relationship set that is based on association analysis, wherein the other instances of the word constitute less than all instances of the word appearing in all interfaces of the application; and generate a new version of the application having a revised translation of the word in the interface and the other instances of the word in the other interfaces.

In another aspect of the invention, there is system including a processor, a computer readable memory, one or more computer readable storage media, and program instructions collectively stored on the one or more computer readable storage media. The program instructions are executable to: receive user input indicating an incorrect translation of a word appearing in an interface of an application; identify other instances of the word in other interfaces of the application, wherein the identifying is performed using a glossary relationship set that is based on association analysis, wherein the other instances of the word constitute less than all instances of the word appearing in all interfaces of the application; and generate a new version of the application having a revised translation of the word in the interface and the other instances of the word in the other interfaces.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
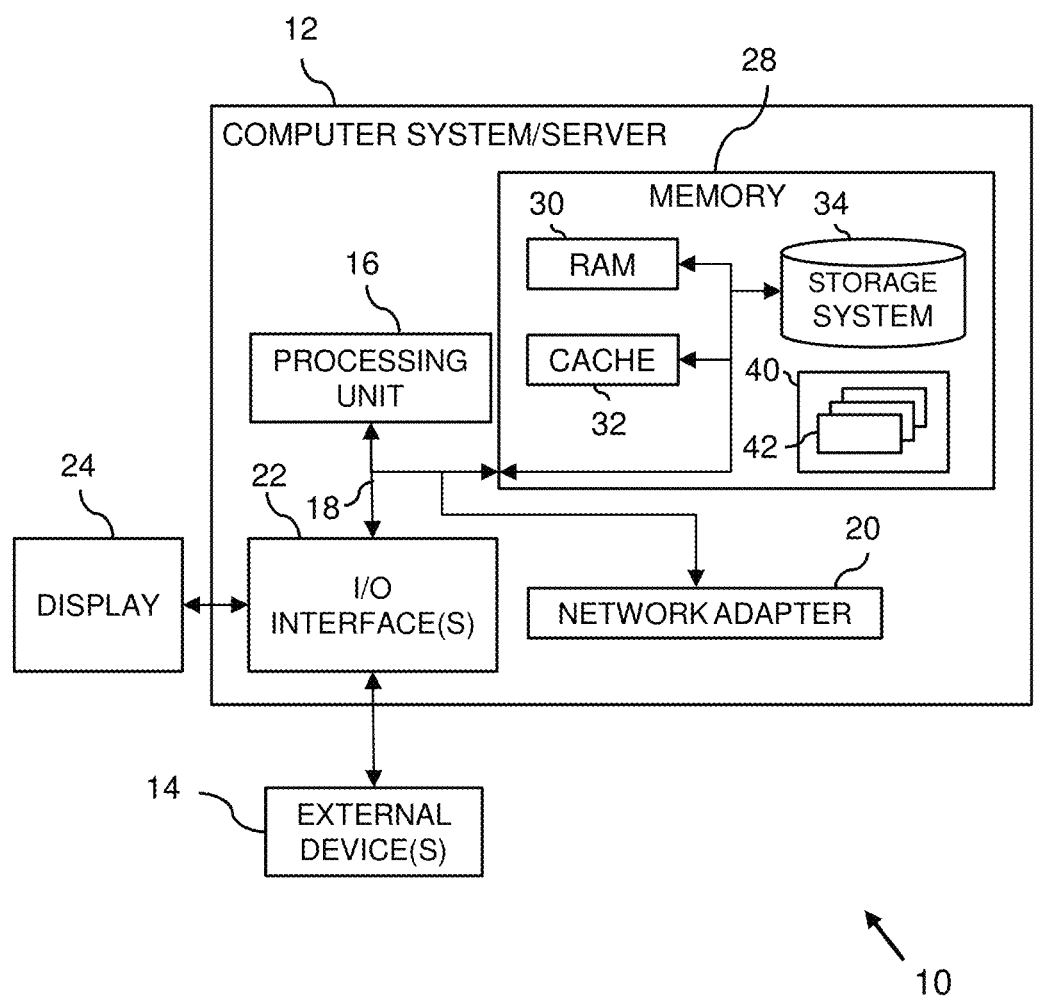
FIG. 1 depicts a computer infrastructure in accordance with aspects of the invention.

Aspects of the present invention relate generally to translation systems and, more particularly, to adjusting translations in software applications based on user feedback. Manual translation and machine translation of software from a first language to a second language often results in incorrectly translated words. Because the user interfaces of applications typically have mostly words and short phrases, it is nearly impossible to determine context directly from a resource file, with the result being that it is very difficult to accurately translate the words that appear in the user interfaces. When a translated word shown in the user interface is incorrect and needs updated, it is difficult to determine which other instances of this same word should also have their translation changed. This is due to some words having a same spelling but different meanings. For example, the polysemous word "log" may refer to a written record of events, a mathematical function, a part of a tree, or an act of entering data. As a result of these different meanings, an incorrect translation of the word "log" in one user interface does not necessarily mean that it is appropriate to change the same word in other instances in other user interfaces of the same application. Moreover, when a problem is found in the translation of one language, it is not easy to judge whether the same translation problem exists in other languages.

Aspects of the invention address this problem by providing a system and method that use clustering and association analysis to determine which instances of a translated word to change, and which not to change, in response to receiving an indication of an updated translation from a user of a software application. Implementations of the invention group resource words (or phrases) based upon functional use cases. Embodiments use cluster analysis on the resource groups and association relationship analysis on a glossary subset to obtain a glossary association relationship set. In response to receiving user specific feedback to auto update a translated word (or phrase), the system uses the glossary association relationship set to determine which instances of the word to update in the resource file (and which instances of the same word to not update). In this manner, implementations of the invention provide for automatically clustering the word resource group to the same functional category and using association relationship analysis to obtain a glossary association relationship set. Implementations also provide for automatically verifying user feedback and updating the word's translation in the glossary association relationship set, thereby providing complete multi-language mutual translation verification. Implementations also provide for automatically selecting all resource groups that are related via the glossary association relationship set and updating these translations at the same time. Implementations also provide for automatically integrating the updated translation into a product system. Implementations also provide for automatically aggregating words of a same functional category and using the association relationship to determine usage scenarios of the words and sentences in the glossary dictionary, thereby improving the accuracy of translation. Implementations also provide for automatically verifying user feedback and complete multi-language mutual translation verification. Implementations also provide for automatically determining all related resource groupings according to the association relationship of glossary and updating all the same translation questions. Implementations also provide for automatically integrating product development, quickly responding to customer feedback, and improving customer satisfaction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
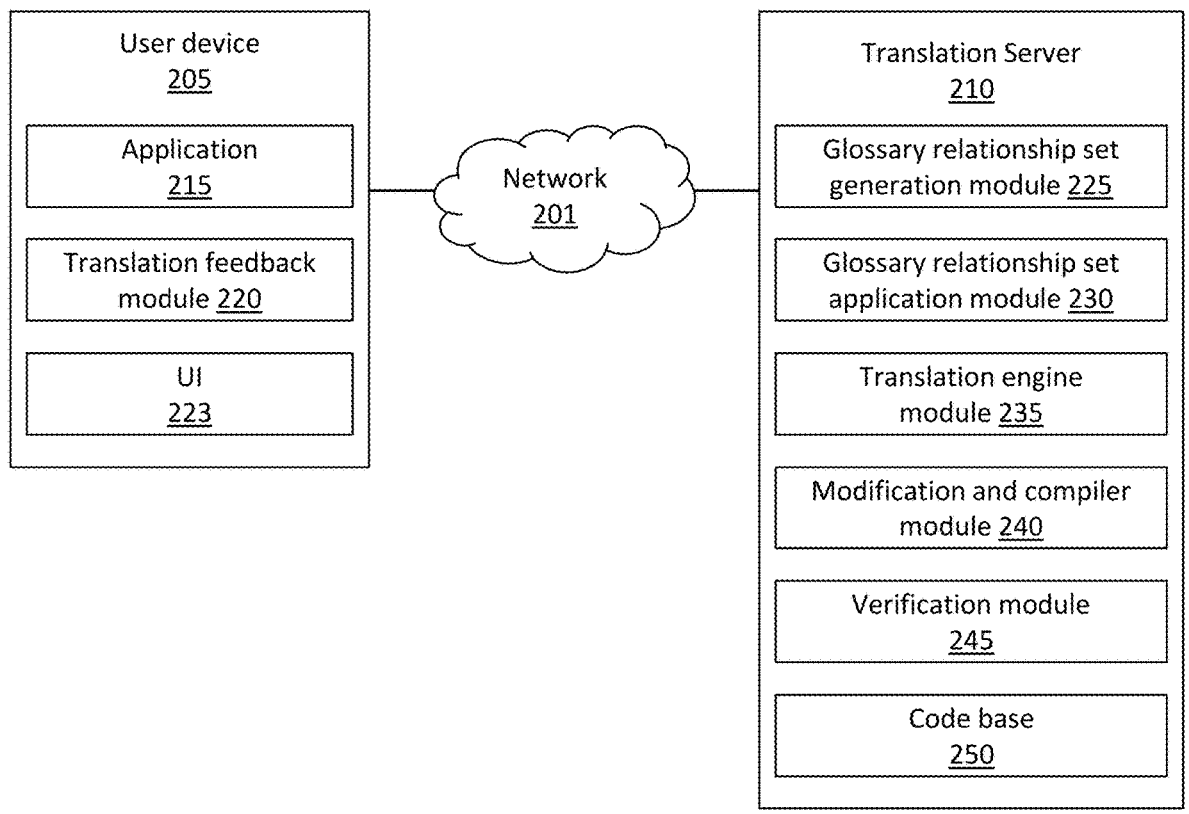
FIG. 2 shows a block diagram of an exemplary environment in accordance with aspects of the invention.

FIG. 2 shows a block diagram of an exemplary environment in accordance with aspects of the invention. In embodiments, the environment includes a network 201 that provides communication between a user device 205 and a translation server 210. The network 201 includes one or more communications networks such as one or more of a LAN, WAN, and the Internet. The user device 205 is a user computing device such as a desktop computer, laptop computer, tablet computer, smartphone, smartwatch, etc., and may comprise one or more elements of computer system 12 (FIG. 1). In one example, the translation server 210 is one or more computing devices each including one or more elements of the computer system 12 of FIG. 1. In another example, the translation server 210 is one or more virtual machines (VMs) or containers running on one or more computing devices.

In embodiments, the user device 205 comprises an application 215 (e.g., a software application), which may comprise one or more programs such as program/utility 40 of FIG. 1. In embodiments, the user device 205 also comprises a translation feedback module 220, which may comprise one or more program modules such as program modules 42 of FIG. 1. The application 215 may be a stand-alone application running locally on the user device 205 or may be a client application that communicates with a host application running remotely from the user device 205. The translation feedback module 220 may be an extension or add-on to the application 215. In embodiments, the application 215 causes the user device 205 to display a user interface (UI) 223 that includes words that have been translated from a product resource file that is written in another language. For example, the UI 223 may be configured to display plural different dialog boxes (e.g., interfaces) each containing plural English language words that have been translated from a product resource file that is written in Chinese. The application 215 can be any type of application such as, for example, a statistical analysis application that a user utilizes to perform statistical analysis of data.

According to aspects of the invention, the translation feedback module 220 causes the UI 223 to display a translation feedback interface by which a user can provide input to indicate an issue (e.g., problem) with a translation of a word included in an interface of the application 215. For example, a user may notice that one of the English language words in one of the dialog boxes does not appear to have been translated correctly, and the user may provide input in the translation feedback interface indicating this word. In accordance with aspects of the invention, the translation server 210 is configured to receive the user input indicating an incorrectly translated word in a particular dialog box, identify other instances of the same word in other dialog boxes based on relationships defined by a glossary relationship set, and provide a new version of the application 215 with a revised translation of the identified instances of the word. In accordance with aspects of the invention, the translation server 210 is configured to only revise the translation of other instances of the same word that have the relationship defined by the glossary relationship set, and not revise the translation of other instances of the same word that do not have the relationship defined by the glossary relationship set. In this manner, implementations of the invention revise the translation of some instances of a word in the application 215 but do not revise the translation of other instances of the same word in the application 215, based on relationships defined by a glossary relationship set as described herein.

In embodiments, the translation server 210 comprises a glossary relationship set generation module 225, glossary relationship set application module 230, translation engine module 235, modification and compiler module 240, and verification module 245, each of which may comprise one or more program modules such as program modules 42 described with respect to FIG. 1. The translation server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the glossary relationship set generation module 225 is configured to generate a glossary relationship set as described herein. In embodiments, the glossary relationship set is a set of plural glossary relationships, where each of the glossary relationships defines a group of associated words from one of the dialog boxes of the application 215. In implementations, the glossary relationship set generation module 225 determines the groups of associated words using clustering techniques (e.g., cosine similarity) and association analysis techniques (e.g., market basket analysis). In embodiments, the glossary relationship set generation module 225 maps the dialogs to the glossary relationships.

In accordance with aspects of the invention, the glossary relationship set application module 230 is configured to identify other instances of a word in other dialog boxes of the application 215 based on the glossary relationship set. In embodiments, in response to receiving an indication of a word and a particular dialog box from the user, the glossary relationship set application module 230 determines a glossary relationship that is mapped to a dialog containing this word, and determines other dialogs that are mapped to the same glossary relationship and that have the same word. In this manner, the glossary relationship set application module 230 determines other instances of the same word that are related in a manner defined by the glossary relationship set.

In accordance with aspects of the invention, the translation engine module 235 is configured to revise a translation of the word in portions of a product resource file that correspond to the words identified by the glossary relationship set application module 230.

In accordance with aspects of the invention, the modification and compiler module 240 is configured to create a new version of the application 215 using the output of the translation engine module 235. In embodiments, the modification and compiler module 240 compiles, assembles, and integrates the modified product resource file to create a new version of the application 215.

In accordance with aspects of the invention, the verification module 245 is configured to verify the modified product resource file. In embodiments, the verification module 245 runs a translation verification test using a translation verification case that is based on the output of the translation engine module 235.

Figure 3A:
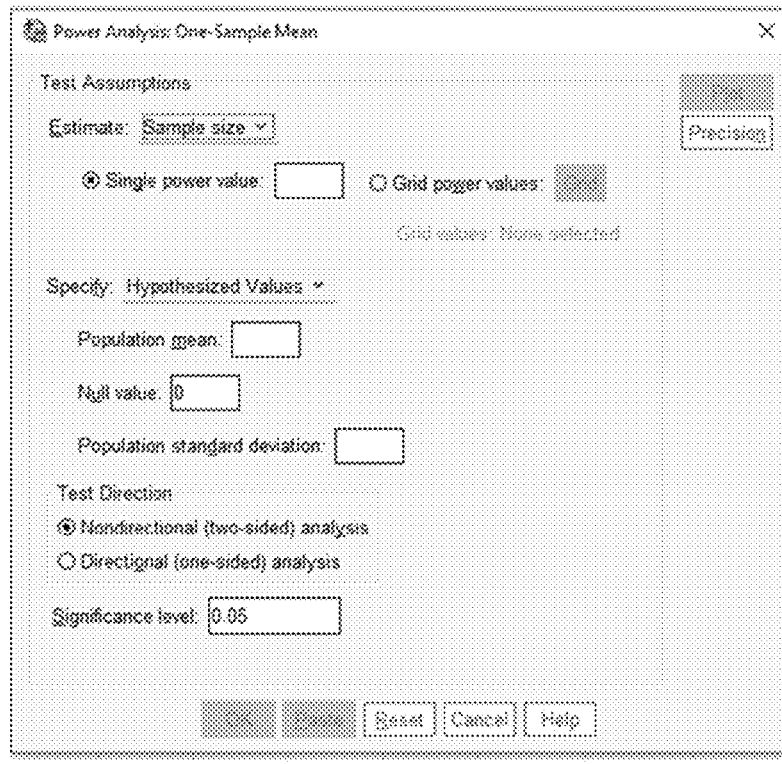
FIGS. 3A and 3B show examples of dialog boxes and dialogs in accordance with aspects of the invention.
Figure 3B:
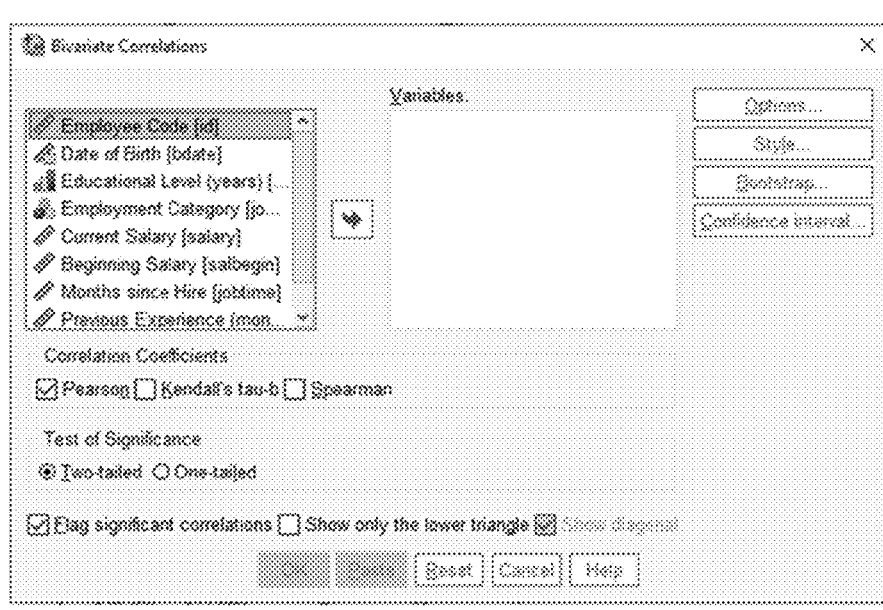

FIGS. 3A and 3B show examples of dialog boxes 311, 312 displayed by the UI 223 of an exemplary statistical analysis type of application 215. There may be any number of such dialog boxes in the application 215 including tens or even hundreds of different dialog boxes. Each dialog box may be associated with a function of the application 215. For example, dialog box 311 may be associated with the function titled Power Analysis One-Sample Mean, and dialog box 312 may be associated with the function titled Bivariate Correlations. Dialog D1 shown in FIG. 3A is a list of all the words included in the dialog box 311 with high frequency words filtered (e.g., omitted). Dialog D2 shown in FIG. 3B is a list of all the words included in the dialog box 312 with high frequency words filtered (e.g., omitted). In embodiments, the glossary relationship set generation module 225 determines a respective dialog (e.g., D1, D2, etc.) for each dialog box of the application 215 by analyzing sections of the product resource file that correspond to the different dialog boxes. In this manner, for a product application that has "n" number of dialog boxes, the glossary relationship set generation module 225 determines D1, D2, ..., Dn different dialogs. As described herein, the glossary relationship set generation module 225 uses the dialogs D1-Dn to determine a glossary relationship set for this application 215. As further described herein, the glossary relationship set application module 230 uses the determined glossary relationship set to determine which instances of a word in the product resource file to change the translation of in response to receiving an indication from a user that the translation of the word is incorrect in one of the dialog boxes.

Figure 4:
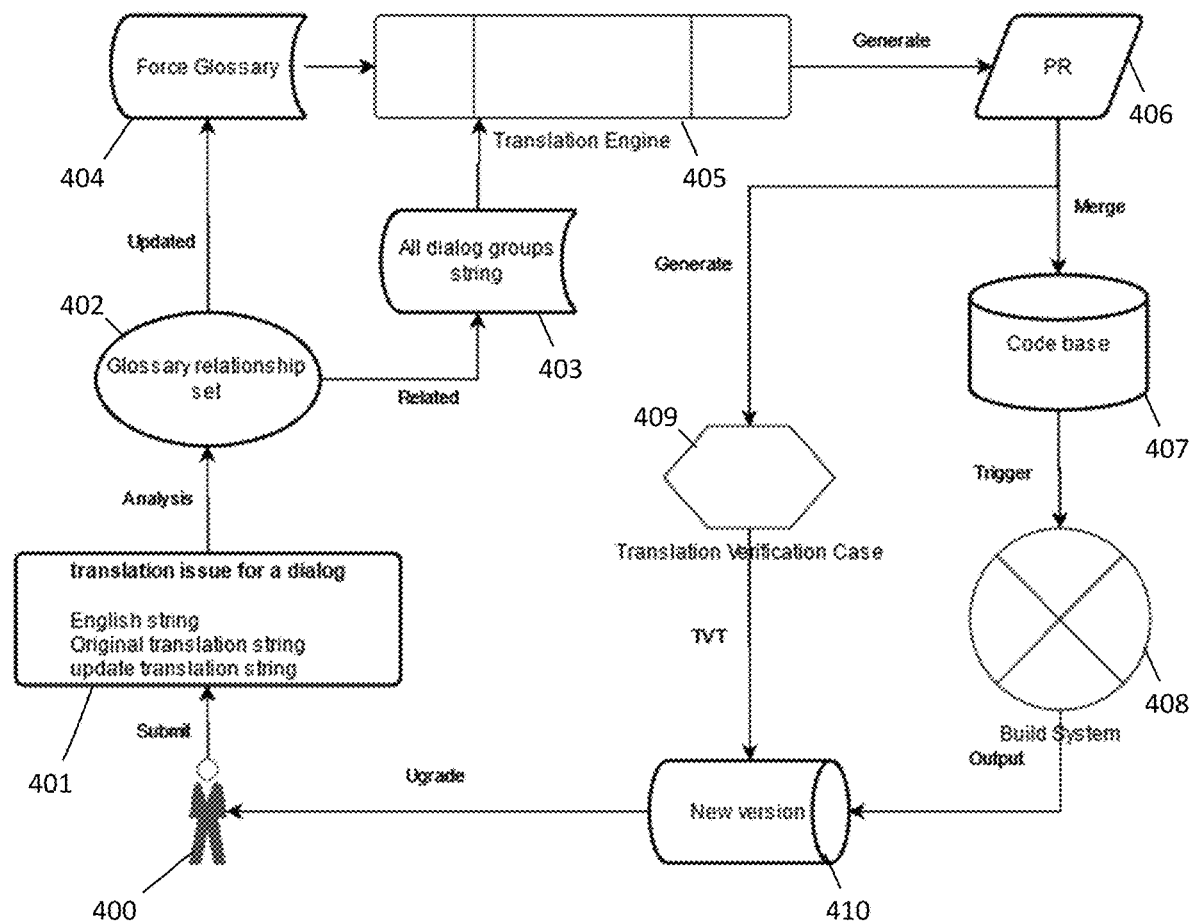
FIG. 4 shows a block diagram of an exemplary process of updating a translation of a word in an application in accordance with aspects of the invention.

FIG. 4 shows a functional block diagram of an exemplary process of updating a translation of a word in an application in accordance with aspects of the invention. Steps of the process may be carried out in the environment of FIG. 2 and are described with reference to elements depicted in FIG. 2. At step 401, a user 400 of the application 215 provides input via the translation feedback interface of the UI 223, the input defining an issue (e.g., problem) with a translation of one of the words in one of the dialog boxes of the application 215. The input may comprise the English-language string (e.g., word), an original translation of the string, and an updated translation of the string. At step 402, the server 210 uses a predefined glossary relationship set to determine a glossary relationship that contains the string (e.g., word) indicated by the user at step 401. At step 403, the server 210 identifies other instances of the same string (e.g., word) that occur in other dialog boxes, the identifying being based on the determined glossary relationship. At step 404, the server 210 updates a force glossary, which is a document that forces certain terms (contained in the document) to be translated in a specific way (defined in the document). In embodiments, the server 210 updates the force glossary to translate the string (e.g., word) indicated by the user in a specific way indicated by the user. At step 405, the server 210 modifies the product resource file of the application 215 by changing the translation of all instances of the word identified at step 403 using the force glossary definition that was updated at step 404. At step 406, the sever 210 generates a pull request (PR) to create a new version of the application 215 based on the modified product resource file from step 405. At step 407, the server 210 merges the modified product resource file with a code base. At step 408, the sever 210 builds a new version of the application 215 using the modified product resource file, e.g., by compiling, assembling, and integrating a new executable version of the application 215. At step 409, the server 210 performs a translation verification test (TVT) of the modified product resource file using a translation verification case. At step 410, the server 210 provides the new version of the application 215 to the user, e.g., via the user device 205.

Figure 5:
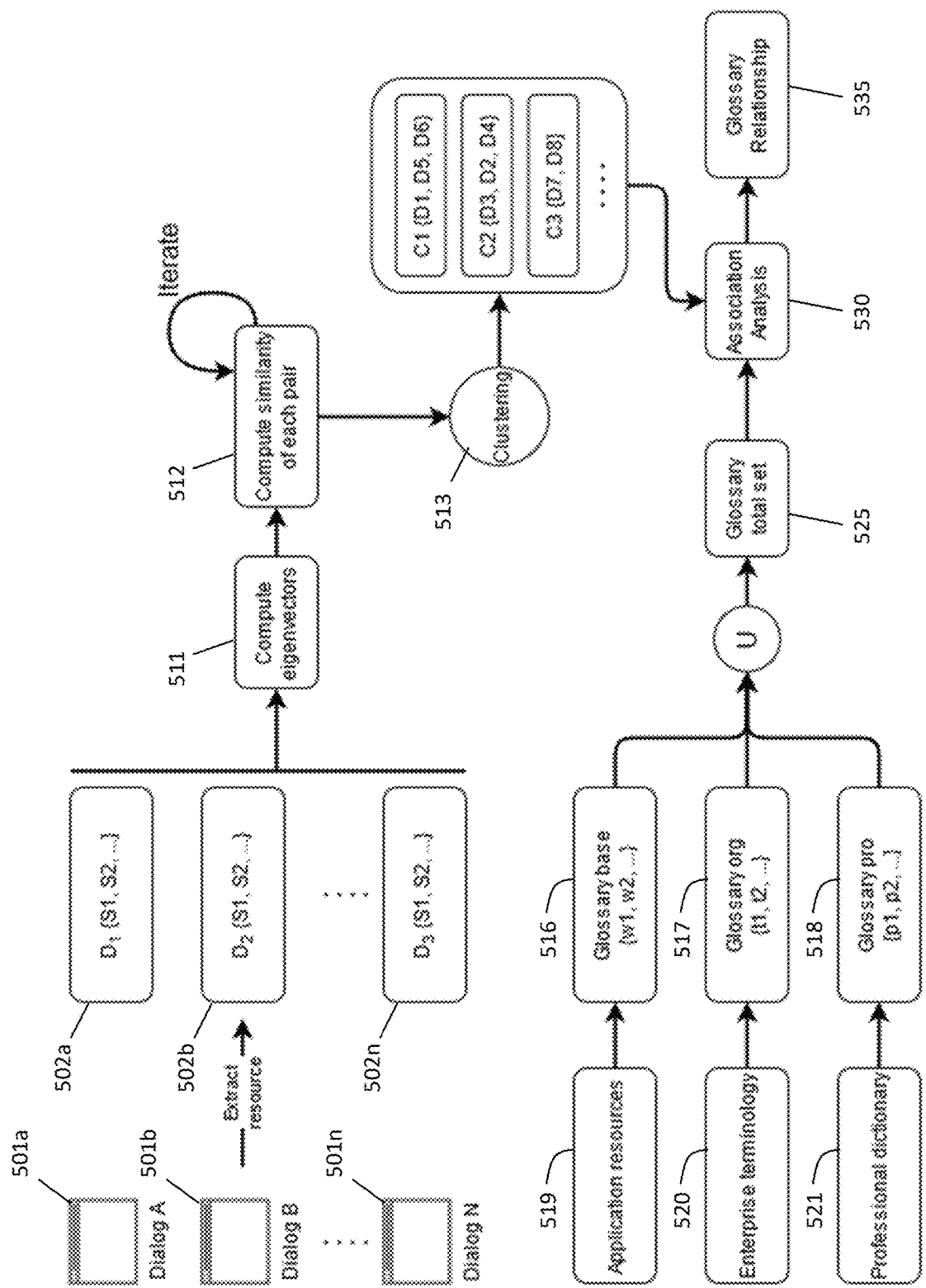
FIG. 5 shows a block diagram of an exemplary process of generating glossary relationships in accordance with aspects of the invention.

FIG. 5 shows a functional block diagram of an exemplary process of generating glossary relationships in accordance with aspects of the invention. Steps of the process may be carried out in the environment of FIG. 2 and are described with reference to elements depicted in FIG. 2-4. Elements 501a, 501b, ..., 501n are dialog boxes (e.g., interfaces) of an application (e.g., application 215), e.g., similar to dialog boxes 311, 312 of FIGS. 3A-B. Elements 502a, 502b, ..., 502n are dialogs that contain groups of words included in respective ones of the dialog boxes 501a-n, e.g., similar to dialogs D1, D2 of FIGS. 3A-B. At step 511, the glossary relationship set generation module 225 computes feature vectors based on the dialogs 502a-n. In embodiments, the feature vectors are eigenvectors based on determined TF-IDF (term frequency-inverse document frequency) scores of respective words in the dialogs 502a-n. At step 512, the glossary relationship set generation module 225 computes a similarity score of each pair of the feature vectors. In embodiments, the glossary relationship set generation module 225 computes the similarity score using cosine similarity of respective pairs of the feature vectors. At step 513, the glossary relationship set generation module 225 clusters the dialogs 502a-n into categories (e.g., C1, C2, C3) using the determined similarities.

With continued reference to FIG. 5, the glossary relationship set generation module 225 generates glossaries 516, 517, 517 by extracting words from various documents 519, 520, 521. At step 525, the glossary relationship set generation module 225 generates a glossary total set by combining the glossaries 516, 517, 517 using a union operation. At step 530, the glossary relationship set generation module 225 performs association analysis on the categories (e.g., C1, C2, C3) to determine glossary relationships 535 for each of the categories. Each one of the categories (e.g., C1, C2, C3) may have one or more glossary relationships. In embodiments, each glossary relationship defines an association of a group of words in the category. In embodiments, the glossary relationship set used at step 402 of FIG. 4 comprises all the glossary relationships of all the categories.

Figure 6:
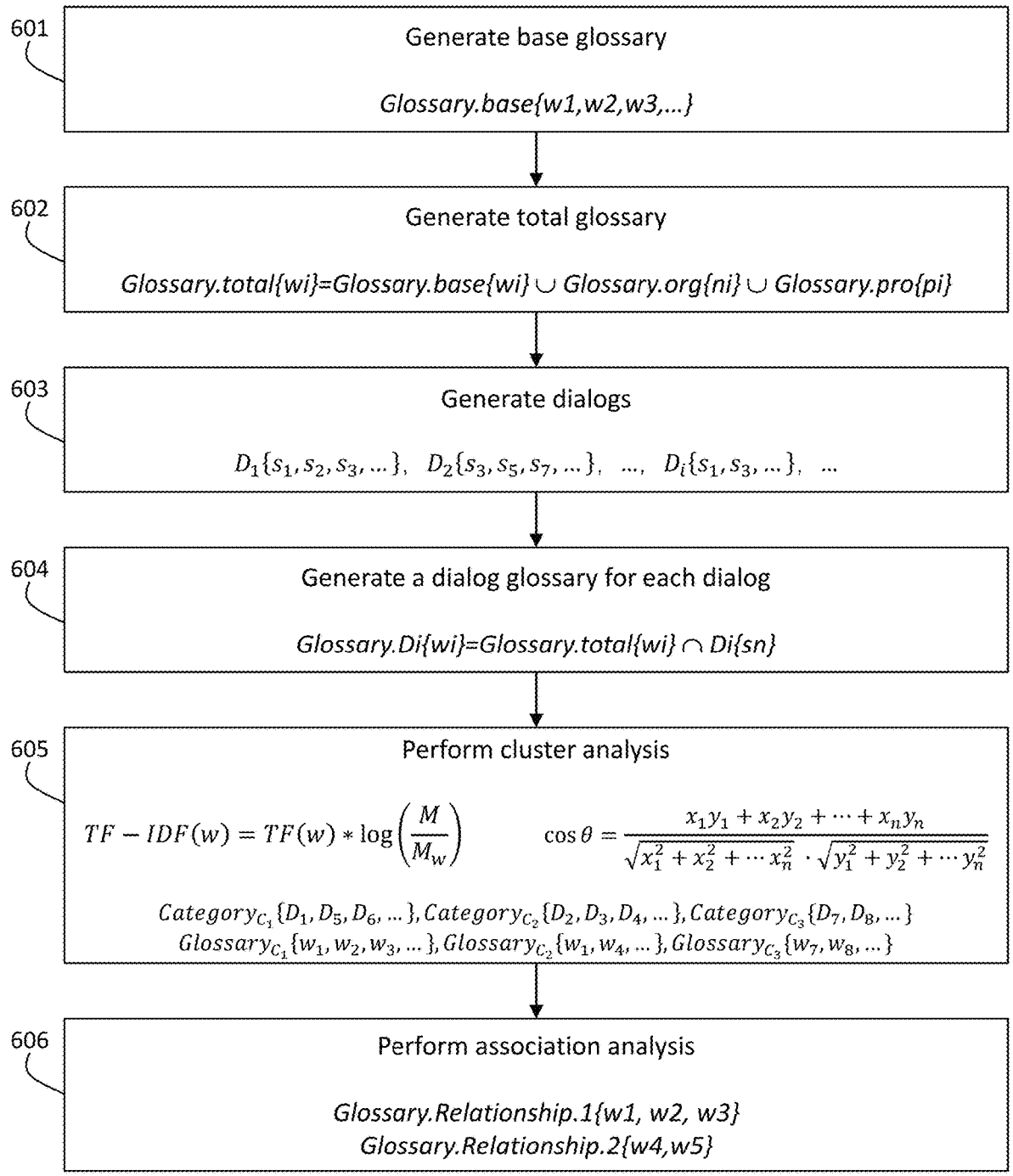
FIG. 6 shows a flowchart of an exemplary method of generating glossary relationships in accordance with aspects of the invention.

FIG. 6 shows a flowchart of an exemplary method of generating glossary relationships in accordance with aspects of the invention in accordance with aspects of the present invention. Steps of the method may be carried out in the environment of FIG. 2 and are described with reference to elements depicted in FIG. 2-4.

At step 601, the system generates a base glossary of the application (e.g., application 215). In embodiments, the glossary relationship set generation module 225 retrieves all resource files associated with the application and extracts words from the resource files using text extraction. In embodiments, the glossary relationship set generation module 225 filters (e.g., omits) high frequency words (e.g., a, an, the, etc.). The resultant word set is a base glossary of the application, e.g., Glossary.base {w1, w2, w3, ...}.

At step 602, the system generates a total glossary for the application. In embodiments, the glossary relationship set generation module 225 combines the base glossary (from step 601) with one or more other glossaries deemed relevant to this application. Other glossaries may include, for example, an organization glossary (e.g., of an organization that created the application) and a professional glossary (e.g., related to the technical field of the application). In embodiments, the glossary relationship set generation module 225 creates the total glossary using a union function with the plural glossaries. The resultant word set is a total glossary of the application, e.g., Glossary.total {wi}.

At step 603, the system generates dialogs for the application. In embodiments, the glossary relationship set generation module 225 extracts words from each dialog box of the application (e.g., dialog boxes 311, 312 of FIGS. 3A-B) and creates groups of the words (e.g., dialogs D1, D2 of FIGS. 3A-B).

At step 604, the system generates a dialog glossary for each dialog. In embodiments, for each dialog, the glossary relationship set generation module 225 determines a set of words at the intersection of the total glossary and this dialog. The resultant word set is a dialog glossary of the dialog, e.g., Glossary.Di{wi}.

At step 605, the system performs cluster analysis to determine categories (e.g., classification combinations) of the dialogs. In embodiments, the glossary relationship set generation module 225 determines a feature vector for each respective dialog glossary Glossary.Di{wi}, the feature vector of a particular dialog glossary being a N-dimensional vector, wherein each dimension corresponds to a TF-IDF score of one of the words included in the dialog glossary using Expression 1:

$$TF-IDF(w) = TF(w) * \log\left(\frac{M}{M_w}\right) \quad (1)$$

In Expression 1, TF(w) is the frequency of a word w appearing in this text (e.g., Dialog Di), M is the total number of texts (e.g., Count (Di)), and Mw is the number of texts in which the word w appears (e.g., Count (Di{w})). For a dialog glossary Glossary.Di{wi} containing n words, the feature vector is given by [a1, a2, a3, . . . an], where a1 is the TF-IDF score of the first word, a2 is the TD-IDF score of the first word, etc. Words that do not appear in the dialog glossary Glossary.Di{wi} correspond to a value of zero (0) in the feature vector of this dialog glossary.

Still referring to step 605, the system determines a cosine similarity between pairs of dialog glossary Glossary.Di{wi} using the determined feature vectors. For example, when the feature vector of a first dialog glossary Glossary.D1 {wi} is given as [x1, x2, x3, . . . , xn] and the feature vector of a second dialog glossary Glossary.D2 {wi} is given as [y1, y2, y3, . . . , yn], then the cosine of an angle between the two is given by Expression 2:

$$\cos\theta = \frac{x_1 y_1 + x_2 y_2 + \ldots + x_n y_n}{\sqrt{x_1^2 + x_2^2 + \ldots x_n^2} \cdot \sqrt{y_1^2 + y_2^2 + \ldots y_n^2}} \quad (2)$$

In cosine similarity, a cosine value of one (1) is most similar and a cosine value of zero (0) is least similar, with the similarity increasing as the value increases between zero and one. In embodiments, clustering is carried out from the bottom up. In one example, the glossary relationship set generation module 225 calculates the cosine similarity between each pair of dialog glossaries Glossary.Di{wi} and combines the dialog glossaries Glossary.Di{wi} whose cosine similarity is greater than a first (high) threshold value into a sub-category. In this manner, the word group of M is divided into M1 sub-categories, where M1<M. In this example, the module then repeats the process using each determined sub-category. In particular, for each sub-category, the glossary relationship set generation module 225 generates a feature vector for the sub-category (e.g., using a TF-IDF score of each word in the sub-category). The glossary relationship set generation module 225 then determines cosine similarity of pairs of the sub-categories using the determined feature vectors of the sub-categories. Using the determined cosine similarities, the glossary relationship set generation module 225 combines ones of the sub-categories that are sufficiently similar (e.g., their cosine similarity score exceeds the high threshold) into larger categories, where the number of larger categories is less than the number of sub-categories. The glossary relationship set generation module 225 iterates this process, thus creating fewer categories, until the categories are not sufficiently similar to combine (e.g., their similarity score is less than a second (low) threshold). Finally, all dialog words are classified and category glossaries are generated. The result is a group of categories, where each category contains a group of dialogs as shown in Expression 3, and a category glossary for each category as shown in Expression 4:

$$\text{Category}_{c1},\{D1,D5,D6,\ldots\},\text{Category}_{c2},\{D2,D3,D4,\ldots\},\text{Category}_{c3}\{D7,Dg,\ldots\} \quad (3)$$

$$\text{Glossary}_{c1},\{w1,w2,w3,\ldots\},\text{Glossary}_{c2},\{w1,w4,\ldots\},\text{Glossary}_{c3}\{w7,w8,\ldots\} \quad (4)$$

In the examples shown in Expression 3 and Expression 4, the words {w1, w2, w3, . . . } in category glossary GlossaryC1 are all the words in the dialogs {D1, D5, D6, . . . } of CategoryC1. Similarly, GlossaryC2 is a set of all the words in the dialogs {D2, D3, D4, . . . } of CategoryC2. In this manner, the glossary relationship set generation module 225 uses clustering and to generate plural categories (e.g., CategoryC1, CategoryC2, etc.) and a category glossary for each category (e.g., GlossaryC1, GlossaryC2, etc.). In embodiments, the different categories (e.g., CategoryC1, CategoryC2, etc.) are mutually exclusive meaning that each dialog (e.g., D1, D2, etc.) appears in only one of the categories.

At step 606, the system uses association analysis using the determined categories (e.g., CategoryC1, CategoryC2, etc.) and category glossaries (e.g., GlossaryC1, GlossaryC2, etc.) to determine one or more glossary relationships for each category. In embodiments, the glossary relationship set generation module 225 uses market basket analysis techniques to determine groups of words in a category glossary that have a support index greater than a support threshold. In embodiments, the support threshold is 0.3 and the support index is shown by Expression 5:

$$\text{Support } \{w_x, w_y, w_z,\} = \frac{\text{Count } (D\{w_x, w_y, w_z,\})}{\text{Count } (\text{Category}_t\{D\})} > 0.3 \quad (5)$$

Using this technique, the glossary relationship set generation module 225 determines groups of words that are associated with one another, these groups referred to glossary relationships Glossary.Ci.Rn {wx, wy, wz}. In embodiments, the glossary relationship set generation module 225 determines plural glossary relationships for each category (e.g., CategoryC1, CategoryC2, etc.). In embodiments, the glossary relationship set used at step 402 of FIG. 4 is all the glossary relationships for all categories.

Figure 7:
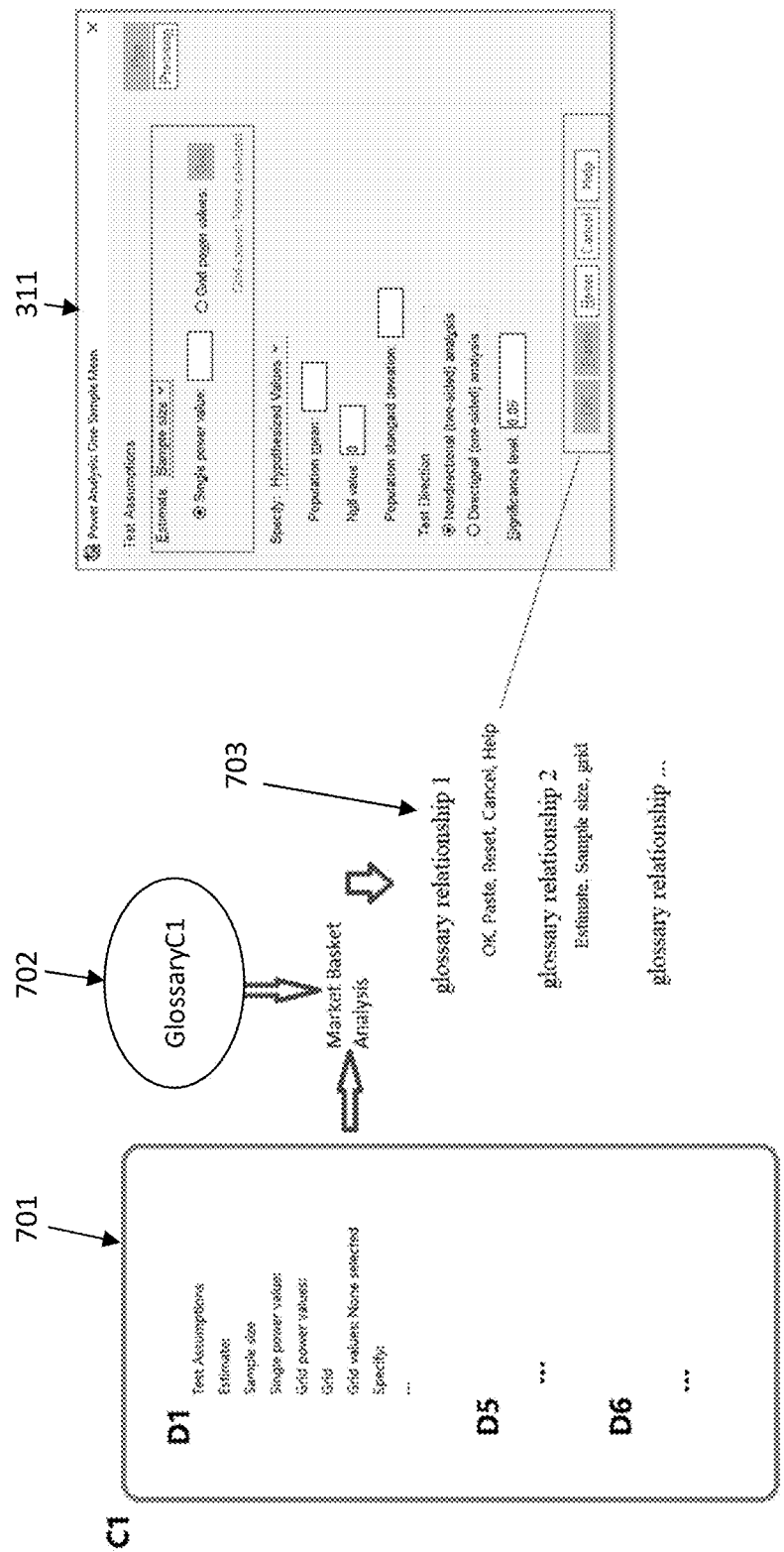
FIG. 7 shows an example of determining glossary relationships for a category in accordance with aspects of the invention.

FIG. 7 shows an example of determining the glossary relationships for CategoryC1. In this example, the glossary relationship set generation module 225 determines category CategoryC1 (shown at 701) includes dialogs D1, D5, and D6, e.g., using clustering as described herein. In this example, the glossary relationship set generation module 225 determines GlossaryC1 (shown at 702) based on the words included in CategoryC1, and then determines glossary relationships (shown at 703) for this category using association analysis as described herein. In this example, one of the determined glossary relationships is the group of words {OK, Paste, Reset, Cancel, Help} in dialog D1. For reference, this grouping of words is shown in dialog box 311 that corresponds to dialog D1.

In embodiments, the glossary relationship set generation module 225 maps two or more dialogs to the same glossary relationship in response to the glossary relationship set generation module 225 determining the same glossary relationship for each of the two or more dialogs. For example, the glossary relationship set generation module 225 determines glossary relationship1 {OK, Paste, Reset, Cancel, Help} in dialog D1 of dialog box 311 (of FIG. 3A) using the clustering and association analysis techniques as described herein. Because dialog box 312 of FIG. 3B includes the same group of words (i.e., OK, Paste, Reset, Cancel, Help), the glossary relationship set generation module 225 will arrive at the same glossary relationship1 {OK, Paste, Reset, Cancel, Help} in dialog D2 of dialog box 312. Based on these same determined glossary relationships, the glossary relationship set generation module 225 determines a mapping of the different dialogs to the same glossary relationship.

Figure 8:
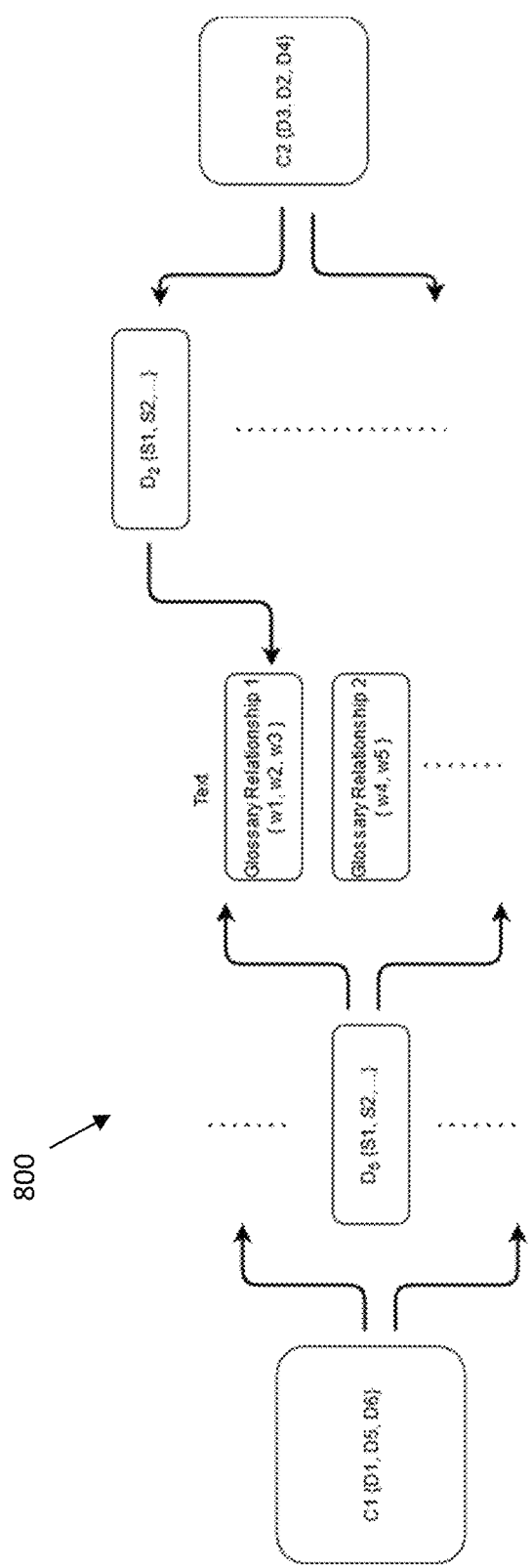
FIG. 8 shows exemplary mappings of dialogs to glossary relationships in accordance with aspects of the invention.

FIG. 8 shows an exemplary mapping 800 of dialogs to glossary relationships in accordance with aspects of the invention. As shown in FIG. 8, dialog D5 included in Category C1 is mapped to glossary relationship1. Also in this example, dialog D2 included in Category C2 is mapped to glossary relationship1. In embodiments, the system uses this mapping to determine which instances of a word to change the translation of in response to receiving user input as described herein.

Figure 9:
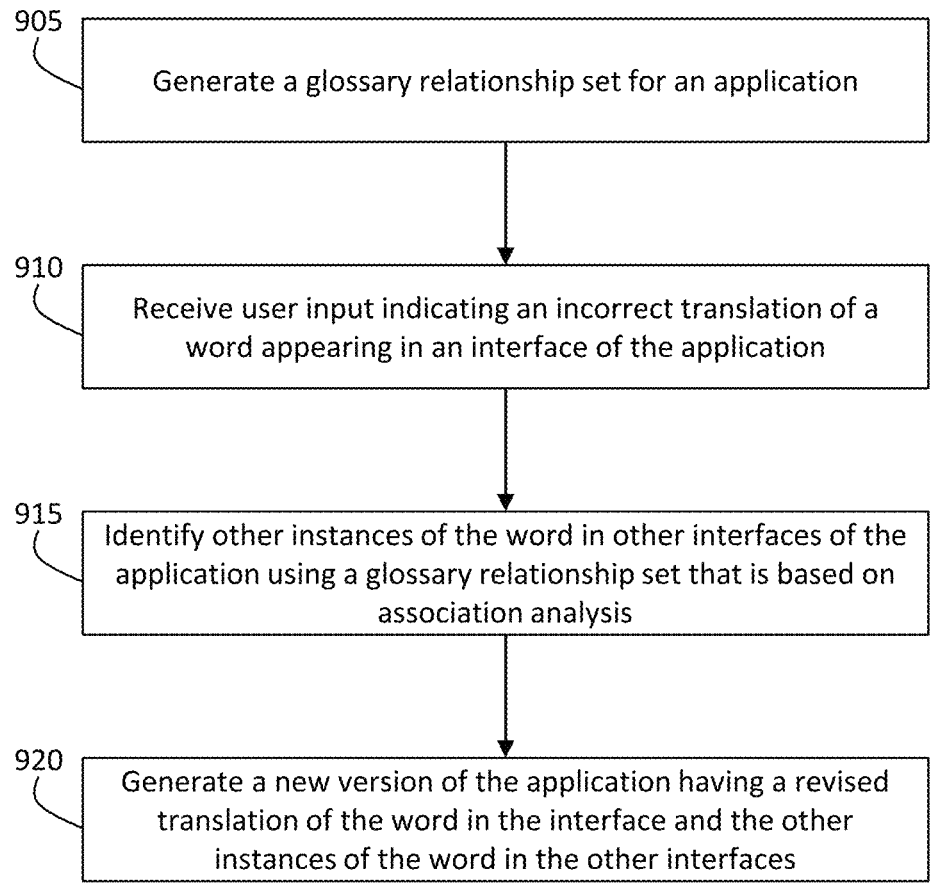
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 2 and are described with reference to elements depicted in FIG. 2-8.

At step 905, the system generates a glossary relationship set for an application. In embodiments, the glossary relationship set generation module 225 generates a dialog for each interface (e.g., dialog box) of the application, wherein the dialog for a respective interface is a list of words appearing in the respective interface. In embodiments, the glossary relationship set generation module 225 groups the dialogs into categories using clustering. In one example, the clustering is based on cosine similarity. In embodiments, the glossary relationship set generation module 225 generating a respective glossary for each of the categories. In embodiments, for each category, the glossary relationship set generation module 225 determines glossary relationships for the category by performing association analysis using the glossary of the category and the dialogs included in the category. In one example, the association analysis is a market basket analysis.

At step 910, the system receives user input indicating an incorrect translation of a word appearing in an interface of the application. In embodiments, a user that is utilizing application 215 on their user device 205 provides input (e.g., via a translation feedback interface shown in the user interface 223) that a word appearing in one of the interfaces (e.g., dialog box 311) is incorrectly translated. In embodiments, the translation server 210 receives this user input via the network 201. The user input may include the incorrectly translated word and a correct translation of the word.

At step 915, the system identifies other instances of the word in other interfaces of the application using a glossary relationship set that is based on association analysis. In embodiments, the relationship application module 230 uses the glossary relationship set for this application 215 to identify other instances of the same word in other interfaces of the application 215. In embodiments, the relationship application module 230 identifies a glossary relationship that is associated with a dialog that contains the word indicated by the user, and uses a mapping (e.g., as shown in FIG. 8) to determine every other dialog that is mapped to the same glossary relationship and that has an instance of the word in the dialog. A dialog that has an instance of the word but that is not mapped to the same glossary relationship is ignored at this step, such that the instance of the word in that dialog will not have its translation changed.

At step 920, the system generates a new version of the application having a revised translation of the word in the interface and the other instances of the word in the other interfaces. In embodiments, the translation engine module 235 revises a translation of the word and the other instances of the word in portions of a resource file that defines the interface and the other interfaces. In embodiments, the modification and compiler module 240 generates a new version of the application 215 having a revised translation of the word in the interface and the other instances of the word in the other interfaces. In embodiments, the verification module 245 tests the new version of the application 215 using a translation verification test. The translation server 210 may deliver the new version of the application 215 to the user device 205.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by a computing device, user input indicating an incorrect translation of a word appearing in a dialog box of an application;
    identifying, by the computing device, other instances of the word in other dialog boxes of the application, wherein the identifying is performed using a glossary relationship set that is based on association analysis, wherein the other instances of the word in the other dialog boxes constitute less than all instances of the word appearing in all dialog boxes of the application; and generating, by the computing device, a new version of the application having a revised translation of the word in the dialog box and the other instances of the word in the other dialog boxes,
wherein the word appearing in the dialog box, and the other instances of the word in the other dialog boxes, are in a first language and are translated from a resource file of the application written in second language different than the first language.

2. The method of claim 1, wherein the identifying comprises determining that respective groups of words containing the other instances of the word are mapped to a same glossary relationship in the glossary relationship set.

3. The method of claim 1, wherein the generating the new version of the application comprises:
revising a translation of the word and the other instances of the word in portions of the resource file that defines the dialog box and the other dialog boxes; and
compiling, assembling, and integrating the new version of the application after the revising.

4. The method of claim 1, further comprising testing the new version of the application using a translation verification test.

5. The method of claim 1, further comprising generating the glossary relationship set.

6. The method of claim 5, wherein the generating the glossary relationship set comprises:
generating a dialog for each dialog box of the application, wherein the dialog for a respective dialog box is a list of words appearing in the respective dialog box;
grouping the dialogs into categories using clustering;
generating a respective glossary for each of the categories; and
for each one of the categories, determining glossary relationships for the one of the categories by performing association analysis using the glossary of the one of the categories and the dialogs included in the one of the categories.

7. The method of claim 6, wherein the clustering uses cosine similarity.

8. The method of claim 6, wherein the association analysis uses market basket analysis.

9. A computer program product comprising one or more computer readable storage media having program instructions collectively stored on the one or more computer readable storage media, the program instructions executable to:
receive user input indicating an incorrect translation of a word appearing in an interface of an application;
identify other instances of the word in other interfaces of the application, wherein the identifying is performed using a glossary relationship set that is based on association analysis, wherein the other instances of the word in the other interfaces constitute less than all instances of the word appearing in all interfaces of the application; and
generate a new version of the application having a revised translation of the word in the interface and the other instances of the word in the other interfaces,
wherein the interface comprises one of plural dialog boxes of the application;
the other interfaces comprise other ones of the plural dialog boxes of the application; and
the word appearing in the interface, and the other instances of the word in the other interfaces, are in a first language and are translated from a resource file of the application written in second language different than the first language.

10. The computer program product of claim 9, wherein the identifying comprises determining that respective groups of words containing the other instances of the word are mapped to a same glossary relationship in the glossary relationship set.

11. The computer program product of claim 9, wherein the generating the new version of the application comprises:
revising a translation of the word and the other instances of the word in portions of the resource file that defines the interface and the other interfaces; and
compiling, assembling, and integrating the new version of the application after the revising.

12. The computer program product of claim 9, wherein the program instructions are executable to test the new version of the application using a translation verification test.

13. The computer program product of claim 9, wherein:
the glossary relationship set comprises a set of plural glossary relationships where each respective one of the plural glossary relationships defines a group of associated words from a respective one of the plural dialog boxes of the application.

14. The computer program product of claim 13, wherein the generating the glossary relationship set comprises:
generating a dialog for each interface of the application, wherein the dialog for a respective interface is a list of words appearing in the respective interface;
grouping the dialogs into categories using clustering based on cosine similarity;
generating a respective glossary for each of the categories; and
for each one of the categories, determining glossary relationships for the one of the categories by performing association analysis using the glossary of the one of the categories and the dialogs included in the one of the categories.

15. A system comprising:
a processor, a computer readable memory, one or more computer readable storage media, and program instructions collectively stored on the one or more computer readable storage media, the program instructions executable to:
receive user input indicating an incorrect translation of a word appearing in an interface of an application;
identify other instances of the word in other interfaces of the application, wherein the identifying is performed using a glossary relationship set that is based on association analysis, wherein the other instances of the word in the other interfaces constitute less than all instances of the word appearing in all interfaces of the application; and
generate a new version of the application having a revised translation of the word in the interface and the other instances of the word in the other interfaces, wherein the new version of the application does not change all instances of the word appearing in all interfaces of the application to the revised translation of the word,
wherein the interface comprises one of plural dialog boxes of the application;
the other interfaces comprise other ones of the plural dialog boxes of the application; and
each of the plural dialog boxes is associated with a respective different function of the application.

16. The system of claim 15, wherein the identifying comprises determining that respective groups of words containing the other instances of the word are mapped to a same glossary relationship in the glossary relationship set.

17. The system of claim 15, wherein the generating the new version of the application comprises:

revising a translation of the word and the other instances of the word in portions of a resource file that define the interface and the other interfaces; and compiling, assembling, and integrating the new version of the application after the revising.

18. The system of claim 15, wherein the program instructions are executable to test the new version of the application using a translation verification test.

19. The system of claim 15, wherein the program instructions are executable to generate the glossary relationship set, and wherein the user input comprises the word, a revised translation of the word, and an indication of a dialog box in which the word appears.

20. The system of claim 19, wherein the generating the glossary relationship set comprises:

generating a dialog for each interface of the application, wherein the dialog for a respective interface is a list of words appearing in the respective interface;

grouping the dialogs into categories using clustering based on cosine similarity;

generating a respective glossary for each of the categories; and for each one of the categories, determining glossary relationships for the one of the categories by performing association analysis using the glossary of the one of the categories and the dialogs included in the one of the categories.

* * * * *